March 18, 1958     F. HERZEGH     2,827,100
CIRCUMFERENTIALLY DIVIDED RIM FOR TUBELESS TIRES
Filed March 24, 1953     2 Sheets-Sheet 1

INVENTOR.
FRANK HERZEGH
BY C. E. Tripp
ATTY.

March 18, 1958 F. HERZEGH 2,827,100
CIRCUMFERENTIALLY DIVIDED RIM FOR TUBELESS TIRES
Filed March 24, 1953 2 Sheets-Sheet 2
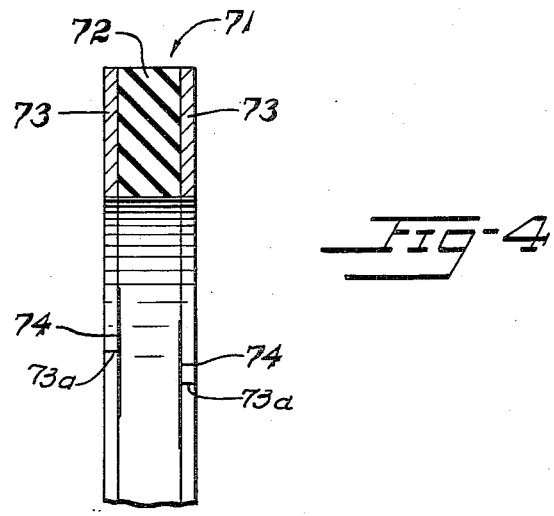
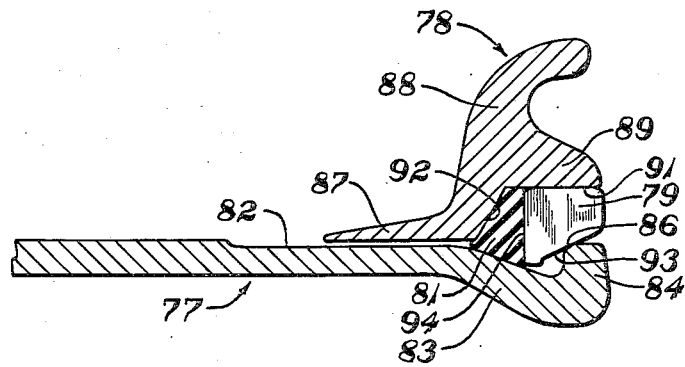
INVENTOR.
FRANK HERZEGH
BY C. E. Tripp
ATTY.

United States Patent Office 2,827,100
Patented Mar. 18, 1958

2,827,100

CIRCUMFERENTIALLY DIVIDED RIM FOR TUBELESS TIRES

Frank Herzegh, Cleveland, Ohio, assignor to The B. F. Goodrich Company, New York, N. Y., a corporation of New York Application March 24, 1953, Serial No. 344,441

9 Claims. (Cl. 152—410)

This invention relates to circumferentially divided rims for tubeless tires and is specifically intended to solve the problem of mounting heavy duty tubeless tires such as those employed on trucks, busses and the like. Due to the weight and stiff construction of heavy duty tires it has been found necessary in many instances to employ circumferentially divided rims in order to make possible mounting and demounting of the tires. Such rims in the present state of the art are commonly made up of three basic elements, namely a rim base section fastened to the wheel, and forming one tire bead support and retaining flange, a demountable side ring section forming the other tire bead support and side ring flange, and locking ring means disposed between opposed shoulders or lips of the two sections for preventing separation of the sections in use. Commercial applications of rims of this type generally involve forming the rims by metal rolling, spinning, folding or the like, the object being to thus form the parts without requiring precise machining operations which would greatly add to the cost of the product. This necessitates reasonable tolerances between the fixed and demountable rim sections and such tolerances are further necessary to prevent freezing of the parts together after protracted use. Of course this presents no problem if the detachable side ring section can be split, but for obvious reasons when tubeless tires are mounted the side ring must be continuous to prevent leakage of air, and being continuous it is necessary that the side ring fit somewhat loosely on the rim base, for the reasons mentioned. The locking ring means are customarily split in order that they may be forced over the lip of a gutter formed at the axially outer side of the fixed rim base section. A further highly desirable result is the elimination of radial motion between the relatively loosely fitting demountable rim section and the fixed rim section in use. Finally, these parts must cooperate to provide an airtight rim in use.

The principal object of the invention, then, is to provide fluid seal and locking ring means which will prevent leakage of air between the continuous side ring and rim base section, which will continuously accommodate itself to relative axial movement or working of the parts in use without affecting the seal, and at the same time will eliminate relative radial motion of the parts.

Other objects are the minimizing of changes in existing or currently available rim assemblies, rendering the assembly safe and fool-proof in operation as well as facilitating mounting and demounting of the tire. Briefly these objects are accomplished by forming a rim assembly of the type referred to which includes a retaining and sealing ring pack. This pack comprises one, or at times two, split metal rings with a rubber ring therebetween, there always being one metal ring having a tapered portion for wedging engagement between radially opposed surfaces of the rim sections, all of which will be explained more fully in the detailed description that follows.

The action of the combination of parts described is such that the rubber ring is confined against destructive extrusion and yet continuously urged by axial force due to pressure within the inflated tire into radial sealing engagement with radially opposed surfaces of the rim sections, and in addition to this ever-present sealing action there is a radial wedging engagement between the split ring having a tapered portion and the two rim sections. As a result of this invention both the sealing and wedging actions are self-adjusting and self-compensating for shifting or working of the parts that might occur in service and neither action interferes with the other. The manner in which these and other objects and advantages may be attained will be apparent from the following detailed description of a preferred embodiment of the invention.

In the drawings:

Fig. 4 shows a modified form of the rubber sealing ring unit.

Fig. 5 shows another modified form of rim assembly wherein one split retainer is employed.

Figure 1:
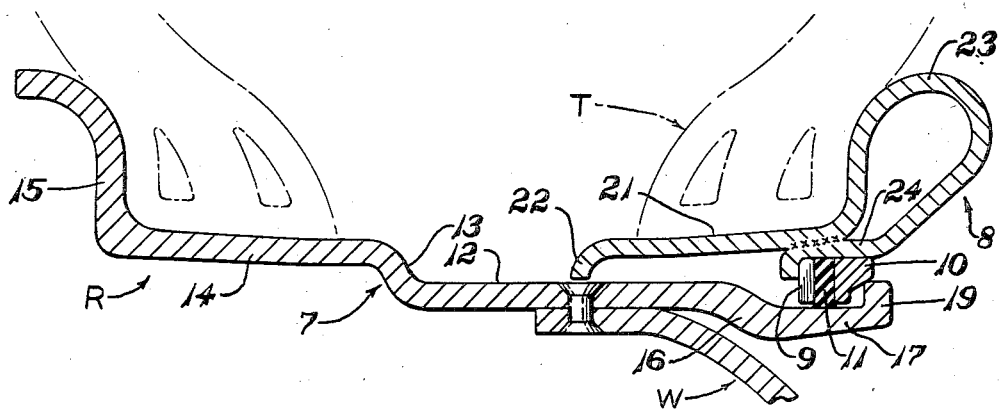
Fig. 1 is a partial section of a wheel and rim assembly embodying the invention wherein two split metal retainers are employed.
Figure 2:
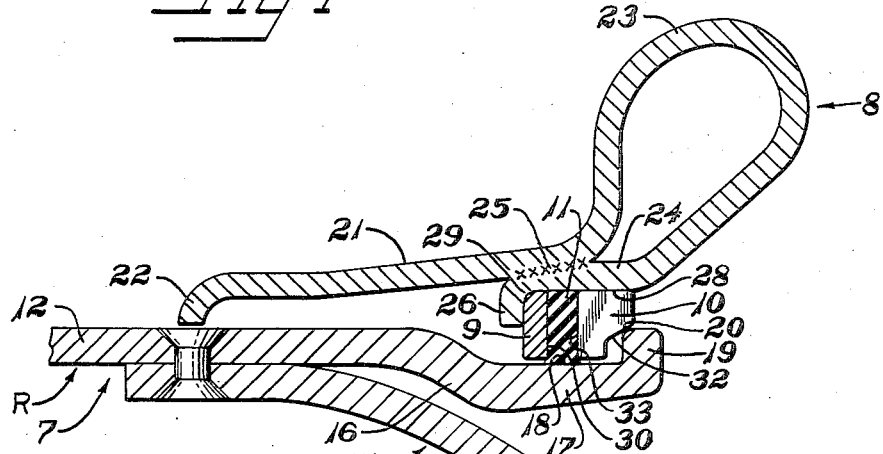
Fig. 2 is an enlarged fragmentary section of the rim assembly.

Referring to Figs. 1 and 2, the rim R is riveted or otherwise fastened to the wheel disc or body W, the wheel body forming no part of the present invention. The rim R comprises a fixed rim base section 7, which is the section that is fastened to the wheel body, and a detachable side ring section 8. The other major element of the rim assembly is what will be referred to as a ring pack, which in this embodiment of the invention comprises a metal split ring 9, a metal split ring 10 having a tapered portion formed thereon, and a rubber ring 11 that is preferably endless disposed between the split rings. The rim base section 7 has a base portion comprising a cylindrical flange 12 connected by an offset 13 to a tire bead flange 14, the outer surface of which is customarily tapered for wedging, sealing engagement with the tire. A tire retaining flange portion 15 is disposed at the axially inner side of the rim base portion. A channel commonly referred to as a gutter is formed at the axially outer side of the rim base portion by a radially inwardly offset flange 16, an axial flange 17 having an outer cylindrical surface 18, and a generally radial lip 19 formed with a rounded or tapered edge 20. In the form shown the side ring section is folded or spun from sheet metal, but it will be understood that a single thickness section, rolled or otherwise formed, may be used without departing from the invention.

In the construction shown the side ring section 8 has a tapered tire bead seating flange portion 21 terminating in a leg 22 that fits loosely on base flange portion 12. The metal is reversely bent as at 23 to form a tire retaining flange and the loop thus formed continues as at 24 until it underlies the flange portion 21 whereupon it may be welded to the latter as at 25. The flange portion 24 terminates in a generally radially inwardly extending lip 26. In the completed ring section the flange portions 24 and 21 that are in engagement form a structurally and functionally unitary member which for convenience will be referred to as the base portion of the side ring section. Flange portion 24 has an inner cylindrical surface 28 formed on that part of the base portion that overlies the gutter. In the ring pack assembly, split ring 9 engages lip 26 on the side ring section, which ring may have a curved edge 29 to fit the radius of the metal at the lip 26. The ring has an axially outer radially extending surface 30 for pressing against rubber ring 11. The split ring 10 is tapered as at 32 for wedging engagement with the rounded corner 20 on the gutter lip 19. The angle of taper 32 is not critical, about 30° being satisfactory;

Split ring 10 is formed with an axially inner radially extending surface 33 opposing the radial surface 30 of ring 9. The rubber ring 11 which is formed of tough but resilient natural or synthetic rubber material compounded with carbon black, is confined between the opposed cylindrical surfaces 18 and 28 on the rim sections and between the opposed radial surfaces 30 and 33 on the split rings.

The mounting and operation of the device just described is as follows:

With the demountable parts removed from the fixed rim section 7 a tire T indicated in broken lines in Fig. 1 is slipped over the rim base section and the axially inner bead is forced over bead flange 14 whereas the outer bead is forced toward the inner bead until it overlies base flange portion 12. The side ring section 8 is now set in place and is held inwardly to provide clearance for insertion of the ring pack. If the parts of the ring pack are separate, split ring 9 is expanded and slipped over lip 19 to be followed by rubber ring 11 and tapered ring 10. The side ring section is now allowed to spring toward its axially outer position under force of the tire, or the parts are manipulated to provide an initial seat if necessary, these mounting procedures being well known in this art. Upon inflation of the tire the beads firmly seat themselves and seal against their respective flanges and sufficient air seal is provided between the rim sections by the ring pack so that initial inflation can be effected. As pressure builds up, the rubber ring, being confined between the adjacent rim part surfaces, and being under axial forces will expand radially and create an effective, leak-proof seal between opposed cylindrical surfaces 18 and 28 formed on the rim sections. Although there may be some clearance between rings 9 and 10 and the surrounding surfaces of the rim sections, this clearance is small enough so that rubber material of the ring 11 will only bulge into the clearance space and will not become extruded and detached from the body of the rubber ring. Since rubber when confined is virtually incompressible the axial force resulting from inflation will not only augment the seal but will simultaneously urge split ring 10 axially outwardly.

The result of this is that tapered surface 32 rides up along corner 20 of the gutter lip thereby expanding ring 10 between the gutter lip and the side ring section. Thus it can be seen that both the sealing action, resulting from the radial distension of rubber ring 11, and the wedging action caused by the axial force against ring 10, occur simultaneously and independently of one another. It can also be seen that a minimum of modifications or alteration of standard rim parts is required and that the assembly is simple to mount and dismount and is safe and fool-proof in operation.

Figure 3:
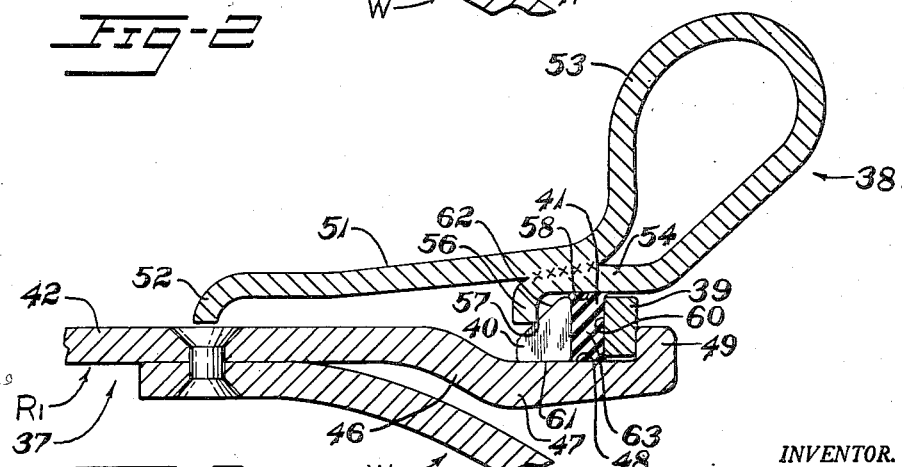
Fig. 3 is a view like Fig. 2 showing a modified form including the two split retainers.

The form shown in Fig. 3 has the same mode of operation as does that just described, but has certain structural differences which might be desirable in some circumstances. In this form the rim base section 37 and the side ring section 38 are like that previously described and again a ring pack is provided comprising split metal rings 39 and 40 with a rubber ring 41, the rubber ring preferably being of endless construction. Rim section 37 is provided with a base flange portion 42 and a gutter portion formed by an off-set 46 and axial flange 47 having a cylindrical outer surface 48 and a generally radial lip 49. The side ring section has a base portion including a tapered flange 51 receiving the tire bead, a bent leg 52, a looped side flange 53 and a return flange 54 welded to the flange 51 and cooperating therewith to form a base portion of the section overlying the gutter. Likewise there is a radial lip 56 at the terminus of flange portion 54 which lip in this case has a rounded or tapered nose 57 that functionally corresponds to the rounded or tapered nose 20 of the gutter lip in the other form of the invention. As before the base portion of the side ring has an inner cylindrical surface 58 that overlies a cylindrical surface 48 of the gutter flange.

Split ring 39 which is a plain ring without a tapered surface is in this form in engagement with the lip 49 of the gutter instead of with the lip on the side ring as is the corresponding ring in the other form. Ring 39 has a radial inner surface 60 adjacent the rubber ring 41. The other split ring 40, has a cylindrical inner side 61 for engaging cylindrical surface 48 of the gutter flange 47 and is tapered as at 62 for engaging the rounded edge 57 of the lip on the side ring section. Split ring 40 likewise has a radial surface 63 that opposes the radial surface 60 of split ring 39 for engagement with the rubber ring 41.

In operation the mounting and assembly of this form is like that described for the other form except that the order of application of the tapered and plain rings is reversed. The action of the rubber ring is the same in that it is confined and therefore will expand radially to seal against opposed cylindrical surfaces 48 and 58 under the axial force of inflation pressure. The aforesaid pressure likewise urges the corner 57 of lip 56 of the side ring section along the tapered portion 62 of the split ring 40. The minimum angle of taper of surface 62 on the ring depends upon the coefficient of friction of the engaged materials. For any combination of materials there is an angle which if not exceeded will cause the parts to be self-locking and hence little or no axial force will be transmitted to the rubber ring. Finding the minimum taper is a mere matter of design and application of the laws of physics. The angle of minimum taper should be substantially exceeded, but of course too steep an angle reduces the radial wedge effect. The result is a continuous self-adjusting wedging engagement between the side ring section and the flange 47 of the gutter. It will be noted that the major difference between this form and the one previously described is that the radial loads are taken by the gutter flange rather than by the gutter lip. On the other hand in so far as the side rim section 38 is concerned, the same loads must now be carried by the side rim lip 56 rather than by the base portion 54 of the side ring. Design and structural considerations will dictate which of these two constructions are to be selected.

Although I contemplate that in the two forms described above only two split metal rings and one rubber ring will be required, in some cases it may be desired to include a pair of auxiliary split metal rings to act as precisely dimensioned confining members. For example, as seen in Fig. 4 an alternate construction of the rubber unit 71 is shown. This construction includes a ring 72, preferably endless and formed of rubber material flanked by a pair of split ring members 73. These members may or may not be bonded to the rubber ring, but if bonded, a plurality of circumferentially spaced gaps 74 in the bond are provided to permit expansion of rings 73 when passing over the gutter lip. The splits 73a in metal rings 73 are disposed at the gaps 74 in the rubber to metal bond to facilitate expansion of the rings 73 during mounting without excessively localizing the strain on the rubber. Rings such as 73 might be used in cases where it is found undesirable to form the split rings 9 and 10 or 39 and 40 with close radial tolerances or where larger gaps between the main rings and the rim sections are provided, in which case the ring members 73 may be held to closer tolerances to insure that an excessive gap will not be present with possible excessive extrusion of the rubber material and eventual destruction or damage of the rubber ring.

Fig. 5 shows an adaptation of the invention to a rim having a different type of gutter and a side ring constructed so that only the tapered split metal locking ring is required. Here fixed and removable rim sections 77 and 78 respectively are provided, and the ring pack comprises a split metal ring 79 and a rubber ring 81, preferably of endless construction.

The fixed rim section 77 is reduced in diameter as at 82 to receive the bead seat flange of the side ring 78. The gutter is formed by a conical flange portion 83 and a lip portion 84, rounded or beveled as at 86.

Side ring section 78 has a tapered bead seat flange 87, tire retaining flange 88, plus an axially outwardly projecting flange 89 with an inner cylindrical surface 91, there being a tapered but generally radially inwardly extending shoulder as at 92 forming a lip for engaging the rubber ring. Split metal locking ring 79 is tapered as at 93 to provide wedging engagement with bevelled corner 86 of the gutter lip. The ring has a radial surface 94 for engagement with the rubber ring 81.

Rubber ring 81 is shaped to substantially fill the cavity formed by the gutter, side ring and split ring so that the rubber ring is substantially confined by opposed surfaces of these parts. The rubber ring is molded with a double tapered surface for close initial engagement with the tapered gutter and side ring confining surfaces.

The assembly and operation of the device of Fig. 5 in many ways resembles that of the form shown in Figs. 1 and 2 except that the split back-up ring is omitted and its function assumed by shoulder or lip 92 on the locking ring. It may be necessary to replace the rubber ring 81 upon changing the tire in this embodiment of the invention, this depending primarily upon the amount of deformation of the rubber in service.

The terms "axially inner," "axially outer," etc. are intended to refer to directions relative to the sides, marginal edges or other parts of the rim proper, and not to the vehicle on which it is mounted. For example, in Figure 5 the generally radial lip means 92 on the side ring 78 is axially inward of the gutter lip means 84 relative to the rim, regardless of which way the rim is turned for mounting on a wheel, or if the rim is integral with the wheel, regardless of which way the wheel is turned for mounting on the vehicle.

Having described the invention so that those skilled in the art may practice the same, I contemplate that modifications thereof may be made without departing from the invention as defined in the appended claims.

I claim:

1. A self-sealing rim assembly for tubeless tires comprising a rim base section having a base portion with tire-retaining means at one side thereof and a gutter portion at the other side thereof, said gutter portion terminating in generally radially outwardly extending lip means; a continuous side ring section having a base portion overlying said gutter portion and having a generally radial tire retaining flange portion, generally radially inwardly extending lip means associated with said side ring and extending toward said gutter portion axially inward of the gutter lip means; a retaining and sealing pack disposed in said gutter portion and between said lip means, said pack comprising a split metal ring having a tapered portion engaging one of said lip means, and a ring of rubber between said split ring and the other of said lip means, said ring of rubber being confined by adjacent surfaces of said split ring, gutter portion and side ring, and in fluid sealing engagement with said gutter and side ring under force tending to urge said side ring axially outwardly, said split metal ring providing a radially wedging engagement between said gutter portion and side ring under the same force, whereby said rim assembly is rendered fluid tight, and radial motion between its parts after inflation of the tire is prevented.

2. A self-sealing rim assembly for tubeless tires comprising a rim base section having a base portion with tire-retaining means at one side thereof and a gutter portion at the other side thereof, said gutter portion terminating in a generally radially outwardly extending lip; a continuous side ring section having a base portion formed with an outer surface for engaging the radially inner surface of a tire bead and with a radially inner surface overlying said gutter portion, said side ring having a tire retaining side flange portion at the axially outer side of said tire bead engaging surface, means associated with said side ring forming generally radially inwardly extending lip means extending toward said gutter portion and disposed axially inward of said gutter lip; split ring means having a radially inwardly facing tapered surface engaging said gutter lip and a radially outer surface engaging the surrounding side ring base portion; and a ring of rubber between said split ring and side ring lip means, said ring of rubber being confined by adjacent surfaces of said gutter, said split ring, and said side ring base portion, said rubber ring being in fluid sealing engagement with said gutter and the overlying surface of side ring base portion under force tending to urge said side ring axially outwardly; said split ring means providing a radially wedging engagement between said gutter lip and side ring under the same force, whereby said rim assembly is rendered fluid tight, and radial motion between its parts is prevented after inflation of the tire.

3. A self-sealing rim assembly for tubeless tires comprising a rim base section having a base portion with tire retaining means at one side thereof and a gutter portion at the other side thereof, said gutter portion terminating in a generally radially outwardly extending lip; a continuous side ring section having a base portion including an axial flange surrounding said rim base section said flange having an outer surface for engaging the radially inner surface of a tire bead, the base portion of said side ring including a flange of larger diameter than said first flange and formed with a radially inner surface overlying said gutter portion, said side ring having a tire retaining side flange portion, said side ring having a lip extending radially from said second flange toward said gutter portion and disposed axially inward of said gutter lip; a split metal ring having a radially inwardly facing tapered surface engaging said gutter lip and a radially outer surface engaging the overlying flange of said side ring base portion; and a ring of rubber between said split ring lip and side ring lip, said ring of rubber being confined by adjacent surfaces of said gutter, said split ring, and said side ring base portion, said rubber ring being in fluid sealing engagement with said gutter and the overlying surface of side ring base portion under force tending to urge said side ring axially outwardly; said split ring providing a radially wedging engagement between said gutter lip and said side ring under the same force, whereby said rim assembly is rendered fluid tight, and radial motion between its parts is prevented after inflation of the tire.

4. A self-sealing rim assembly for tubeless tires comprising a rim base section having a base portion with tire retaining means at one side thereof and a gutter portion at the other side thereof, said gutter portion having a tapered base flange terminating in a generally radially outwardly extending lip; a continuous side ring section having a base portion including an axial flange surrounding said rim base section said flange having an outer surface for engaging the radially inner surface of a tire bead, the base portion of said side ring including a flange of larger diameter than said first flange and formed with a radially inner surface overlying said gutter portion, said side ring having a tire retaining side flange portion, said side ring having a tapered lip extending radially from said second flange toward the axially inner side of said gutter portion and disposed axially inward of said gutter lip; a split metal ring having a radially inwardly facing tapered surface engaging said gutter lip and a radially outer surface engaging the overlying flange of said side ring base portion; and a ring of rubber between said split ring lip and side ring lip, said ring of rubber having tapered surfaces engaging the tapered surfaces of said side ring and gutter portion and a surface complementary to the adjacent surface of said split metal ring, said ring of rubber being confined by adjacent surfaces of said gutter, said split ring, and said side ring base portion, said rubber ring being in fluid sealing engagement with said gutter and the overlying surface of side ring base portion under force tending to urge said side ring axially outwardly; said split ring providing a radially wedging engagement between said gutter lip and said side ring under the same force, whereby said rim assembly is rendered fluid tight, and radial motion between its parts is prevented after inflation of the tire.

5. The assembly of claim 1 wherein said retaining and sealing pack also includes another split metal ring disposed between said ring of rubber and said other lip means.

6. The assembly of claim 1 wherein said retaining and sealing pack also includes another split metal ring disposed between said ring of rubber and said other lip means, said split metal rings having opposed generally radial surfaces engaging said ring of rubber.

7. The assembly of claim 1 wherein said gutter portion is formed with an axial flange with a cylindrical outer surface that terminates in said generally radially outwardly extending lip means.

8. The assembly of claim 1 wherein said retaining and sealing pack also includes another split metal ring disposed between said ring of rubber and said other lip means, the split metal ring having a tapered portion having that portion in engagement with said gutter lip means.

9. The assembly of claim 1 wherein said retaining and sealing pack also includes another split metal ring disposed between said ring of rubber and said other lip means, the split ring having a tapered portion having that portion engaging the generally radially inwardly lip means associated with said side ring.

References Cited in the file of this patent

UNITED STATES PATENTS

| | | |
|---|---|---|
| 1,132,898 | Autstin | Mar. 23, 1915 |
| 2,468,947 | Sinclair | May 3, 1949 |